United States Patent [19]

Dankert

[11] 4,134,546

[45] Jan. 16, 1979

[54] WOOD CROSSTIES WITH CELLULAR PLASTIC INSERTS

[75] Inventor: Lester J. Dankert, Midland, Mich.

[73] Assignee: The Dow Chemical Company, Midland, Mich.

[21] Appl. No.: 748,986

[22] Filed: Dec. 9, 1976

[51] Int. Cl.$^2$ ............................................. E01B 9/16
[52] U.S. Cl. ....................................... 238/370; 238/84
[58] Field of Search ................... 238/83, 84, 370, 371, 238/366, 372, 373, 377

[56] References Cited

U.S. PATENT DOCUMENTS

| | | | |
|---|---|---|---|
| 1,598,249 | 8/1926 | Parsons | 238/366 |
| 2,050,432 | 8/1936 | Hayes | 238/366 |
| 3,813,040 | 5/1974 | Heinemeyer | 238/84 |
| 3,939,617 | 2/1976 | Eisses | 238/84 |

FOREIGN PATENT DOCUMENTS 751341 6/1956 United Kingdom ..................... 238/373

OTHER PUBLICATIONS

Modern Plastics, "Always Something New in Urethane Foam," pp. 92–96, Aug. 1967.

Primary Examiner—L. J. Paperner
Assistant Examiner—Carl Rowold
Attorney, Agent, or Firm—Tai-Sam Choo

[57] ABSTRACT

A wooden structure incapable of holding a fastening device is restored by boring a hole of a desired size into the structure, cleaning the hole, and introducing a cellular plastic insert of a suitable size, so that the insert can hold a fastening device driven thereinto. The method is particularly useful for restoring a "spike-killed" railroad crosstie; the insert is composed of cellular high density polyethylene having average bulk density from about 15 to 50 pounds per cubic foot.

4 Claims, 6 Drawing Figures

WOOD CROSSTIES WITH CELLULAR PLASTIC INSERTS

BACKGROUND OF THE INVENTION

This invention, while not necessarily so limited, relates to wooden railroad crossties used to support rails on a railway roadbed and more particularly to wooden ties having cellular plastic inserts therein for retaining rail fastening devices.

In the conventional construction of railroads, a metallic tie plate carrying a rail is disposed upon a surface of a wooden tie to spread and distribute the load or weight transmitted to the tie from the rail supporting a passing train. This area of the tie beneath the tie plate is commonly referred to as the wear area because this is the area that tends to disintegrate sooner than the other areas of the tie. Conventionally, the tie plate and the rails are secured to the wooden tie by spikes driven through holes disposed near the lateral edges of the tie plate. These spikes secure the rail to the tie plate; and they likewise secure the tie plate to the wooden tie to restrict horizontal and vertical movements of the rail as a train passes over the rail.

Customarily, each of the two rails of a railroad track is canted inwardly by the tie plate being disposed at a slope of one unit of rise to 40 units of run to improve the load-bearing qualities and to help maintain the gauge (distance between the rails) of the rails particularly when a train passes. Because each rail is canted inwardly of the track, the passage of train wheels on the track tends to cause a slight horizontal and vertical movement of the rail to occur. These movements simulate a wave. Such combination of vertical and horizontal motion tends to effect a rocking movement of the tie plate on the tie which movement, in turn, causes loosening of the spikes driven through the tie plate and into the tie. Therefore, the spikes have to be tightened within predetermined intervals. After a certain time, however, such a tightening procedure is no longer possible, because the wood in the vicinity of spike holes on account of moisture, biological influences, stresses and the like, has become so deteriorated and disintegrated that the spikes no longer have a sufficient hold therein. Such a deteriorated condition of the tie is known in the art as "spike-kill." The condition is further aggravated by a phenomenon known in the art as "plate cutting" wherein the rocking movement of the tie plate on the tie causes an indentation in the tie, i.e., the cutting or wearing of the wooden tie in the wear area.

The process of "spike-kill" is accelerated by a number of other factors. For instance, dust and abrasive particles from the roadbed are trapped in the enlarged spike holes. The rocking movement of the spikes under the load and vibration of passing trains literally grind the abrasive particles in the spike holes into the surrounding tie destroying the supporting characteristics of the wood fibers and further enlarging the spike holes. In recent years, the problem of "spike-kill" has further been aggravated by the increased loading and the faster speed of travel of rail cars, which have significantly increased the cyclic impact loading of the tie through the rail and tie plate.

The "spike-killed" ties have often been replaced at a considerable expense of time, labor and materials. To salvage the "spike-killed" ties that are not replaced, it has been the practice to bore out the worn spike holes and to set in wooden dowels, or to fill such holes with epoxy resin. Wooden dowels are disadvantageous because they are usually cut lengthwise of the grain and cause their end grain to be exposed to environmental water penetration and are subject to splitting when a spike is driven into the dowel. Resin filled holes are disadvantageous because the resin mass is different from the surrounding wood and a spike cannot be driven into the resin. It is also known to repair the "spike-killed" tie by closing the worn spike holes with wooden dowels and to slidably displace the tie plates away from their old position and then to respike these plates to the tie in the new position. This type of repair is also very time consuming and expensive and can only be used for a limited number of times.

An object of this invention is to provide a new and advantageous crosstie for use in conventional railroad track systems, particularly to support and secure rails on a railway roadbed composed of particulate ballast such as crushed rock.

Another object is to provide such crossties which are more durable and more resistant to "spike-kill" than wooden ties but which have at least comparable holding power to retain the spikes in position.

Yet another object is to provide a method of upgrading or repairing "spike-killed" wooden ties in service without major modification of the track.

Other objects and advantages of the invention will become apparent in the following description.

SUMMARY OF THE INVENTION

Figure 1:
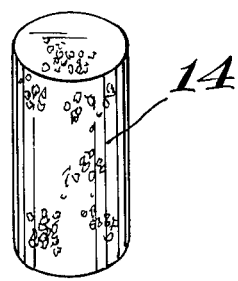
FIG. 1 is a perspective view of a cylindrical insert of the present invention designed to accommodate a single fastening device driven thereinto.
Figure 2:
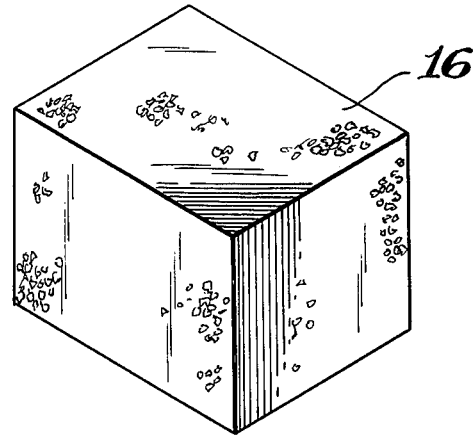
FIG. 2 is a perspective view of a large, rectangular insert of the present invention designed to accommodate a plurality of fastening devices driven thereinto.
Figure 3:
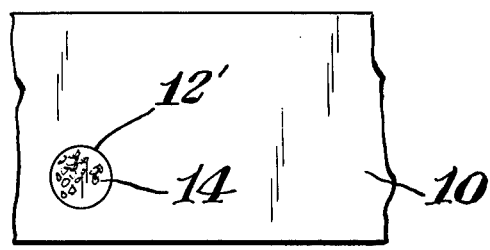
FIG. 3 is a top plane view of the insert of FIG. 1 embedded in a reconditioned hole in a wooden tie.

In accordance with the present invention, the above and other objects are obtained by the insert for retaining the rail fastening devices in a wooden railway crosstie, comprising cellular plastic having a holding characteristic better than that of wood, such insert being a generally elongate solid body adapted to be disposed generally perpendicular to the fastening surface and embedded in the wooden crosstie so that the insert extends from the fastening surface into the crosstie at the place where a fastening device is to be inserted. More specifically, the insert is composed of cellular high density polyethylene and has average bulk density from about 15 to 50 pounds per cubic foot.

A "spike-killed" wooden railroad tie is restored by boring a hole of a desired size into the crosstie, cleaning the hole, and introducing a cellular plastic insert of a suitable size into the hole so that the insert can hold a fastening device driven thereinto. More specifically, the insert is composed of cellular high density polyethylene and has average bulk density from about 15 to 50 pounds per cubic foot.

DETAILED DESCRIPTION AND EMBODIMENTS

The insert for retaining rail fastening devices is advantageously made of cellular high density polyethylene, especially when reinforced with glass-fiber, the cellular material having apparent (bulk) density from about 15 to about 50 pounds per cubic foot (specific gravity from about 0.24 to about 0.8). Such material is hard, tough and resistant to deterioration by weather, by molds, fungi, bacteria and other naturally occurring organisms, and by chemicals occurring in the environment or discharged from passing trains. Because of their toughness and resistance to deterioration, such insert holds the spike securely against loosening by vibration or enlargement of the spike hole. In place of cellular polyethylene, other materials can be used in the insert for retaining rail fastening devices, including, for example, other formed polymers of ethylene and of polypropylene, rigid cellular plastic compositions such as those composed of polyurethanes, polyesters such as poly(1,4-butylene terephthalate), nylons, PVC resins, ABS resins, rubber modified polystyrene resins, phenolic resins and the like. Also, shaped and cured mixtures of resinous and fibrous materials can be used as well as compositions with a pigment, fillers, fibers and other reinforcements, and the insert can be monolithic or made of a plurality of materials in laminated or coated form, or of a shell of one material around a core of another material, or in other configurations.

Wooden railroad crossties of this invention can be made from conveniently available wood, such as oak (hard wood), douglas fir (a soft wood) or pine (a soft wood) or the like. The wooden tie is conventionally impregnated with creosote for preserving wood from the deteriorative nature of water, insects, microorganisms, and the like. The dimensions of the crosstie vary according to its application.

Figure 5:
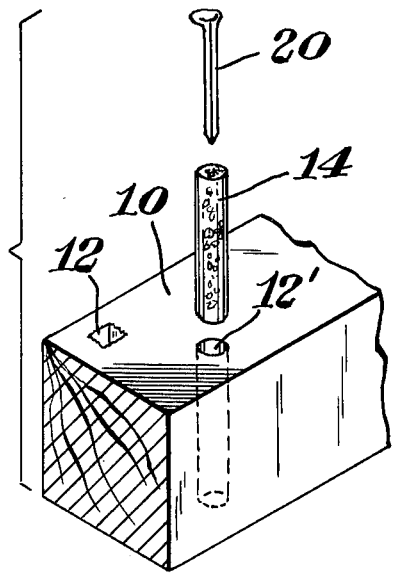
FIG. 5 is an exploded perspective view illustrating the method of reconditioning a previously used spike hole, placing the insert into the spike hole and driving the spike into the insert.
Figure 6:
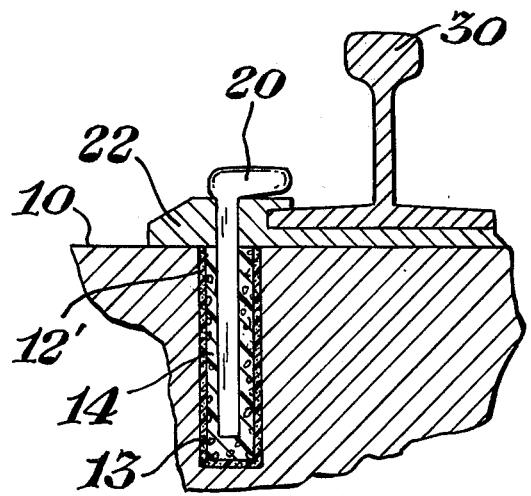
FIG. 6 is a sectional view through a typical installation of the present invention in a wooden tie.

In one embodiment of this invention, a wooden crosstie 10 having a worn spike hole 12 is reconditioned by boring out the hole 12, preferably to a uniform shape and size, such as a cylinder of standard diameter and depth as shown at 12' in FIG. 5, and driving into the hole 12' a cylindrical insert 14 of cellular plastic of a corresponding size. The depth of the hole 12' and the length of the insert 14 are greater than that of a rail fastening device 20 driven thereinto. The insert 14 is desirably sized to provide friction fit with the cylinder 12' and may be slightly oversized of the cylinder 12' when the cellular plastic plug is sufficiently compressible. When the insert 14 is placed into the hole 12', a tie plate 22 and a rail 30 positioned thereon can be fastened to the crosstie 10 using the fastening device 20, as shown in FIG. 6. The insert 14 may be bonded to the wall of the hole 12' using an adhesive layer 13 to completely seal the interface therebetween, as shown in FIG. 6.

Figure 4:
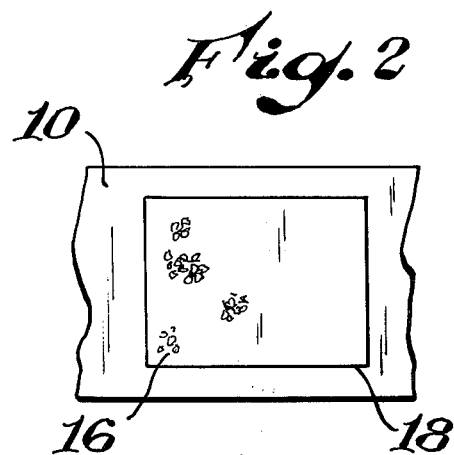
FIG. 4 is a top plane view of the insert of FIG. 2 embedded in a rectangular recess in a wooden tie.

In another embodiment of this invention, a "spike-killed" tie 10 is reconditioned by routing out the damaged portion of the tie 10, preferably using a standard jig and router to provide a recess, as shown at 18 in FIG. 4, of predetermined length, width and depth, and then forcing into such a recess 18 the cellular plastic insert 16 in the form of a block. The depth of the insert 16 is greater than the length of a rail fastening device 20. Such insert 16 is desirably sized to provide friction between the recess 18 and may be slightly oversized of the recess 18 when the foam plug or block 16 is sufficiently compressible.

In a preferred embodiment of this invention, such inserts are composed of cellular high density polyethylene having average bulk density from about 15 to 50 pounds per cubic foot. Furthermore, the inserts are adhesively bonded to the wall of the cylinder or the recess to prevent loosening of the insert and to completely seal the interface between the wall and the insert. The wall of the cylinder or the recess can also be treated with preservative before placing the insert. The above described embodiments of this invention are advantageously employed to modify a new wooden tie. When either new or reconditioned wooden ties having such inserts are used, spikes driven into the cellular plastic hold without loosening, and the inserts resist deterioration by weather, molds, bacteria and chemicals.

Many of the embodiments of railroad crossties of this invention are capable of being fabricated on the track or job site by emplacing the spike holding inserts into holes freshly machined in the tie.

The examples that follow illustrate the invention but are not to be taken as limiting its scope.

EXAMPLE 1

The worn spike hole of a used wooden crosstie is drilled out to a uniform cylindrical hole of one and one-half inch diameter and a depth of five inches. A cylindrical plug having the same diameter and length as those of the hole is made from high density polyethylene foam. The foam is made from polyethylene having density of 0.965 gram per cubic centimeter and Standard Melt Index of 0.7 dg/min, compounded with about 3 weight percent carbon black pigment and about 1 weight percent azodicarbonamide blowing agent. The composition is heated above the melting point of the polymer and above the decomposition temperature of the blowing agent, allowed to expand to closed-cell foam having density of about 30 pounds per cubic foot, and then cooled. The foam plug is driven into the bored hole in the crosstie until the outer end of the plug is nearly flush with the surface of the tie. A rail spike can be driven into the foam plug.

EXAMPLE 2

A used wood crosstie 8 inches wide and 6 inches thick having numerous old spike holes and badly cut surface in the wear area is reconditioned: a rectangular recess, 5 inches wide centrally of the width of the tie, 12 inches long in the direction of the length of the tie to include the spike holes and cut surface, and 4 inches deep, is mechanically routed out; a rectangular block of high density polyethylene foam as described in Example 1 is made to the same dimensions of length, width and depth as those of the recess and is formed into that recess. The reconstructed tie is replaced in the roadbed, and rail plates and rails are installed over the foam blocks using spikes.

While certain representative embodiments have been shown in detail for the purposes of illustrating the invention, it will be apparent to those skilled in the art that various changes and modifications can be made without departing from the spirit and scope of the invention.

What is claimed is:

1. Method for restoring a wooden structure incapable of holding a fastening device, which comprises the steps of boring a hole of a desired size into said structure, cleaning said hole, and introducing a cellular plastic insert into said hole, said insert being of a size greater than that of said hole so as to cause a friction fit therebetween, so that said insert can hold said fastening device driven thereinto.

2. The method of claim 1 wherein the insert is composed of cellular high density polyethylene and have average bulk density from about 15 to 50 pounds per cubic foot.

3. The method of claim 1 wherein the insert is adhesively bonded to the wall of said hole to completely seal the interface therebetween.

4. Method for restoring a spike-killed railroad crosstie incapable of holding a rail fastening device, which comprises the steps of boring a hole of a desired size into said crosstie, cleaning said hole, and introducing a generally elongate solid body of cellular plastic insert into said hole, said insert being of a size greater than that of said hole so as to cause a friction fit therebetween, so that said insert can hold said rail fastening device driven thereinto.

* * * * *